US007504156B2

(12) United States Patent
Iyer et al.

(10) Patent No.: US 7,504,156 B2
(45) Date of Patent: Mar. 17, 2009

(54) DEW RESISTANT COATINGS

(75) Inventors: Pradeep S. Iyer, Hacienda Heights, CA (US); Liviu Dinescu, Chatsworth, CA (US); Chia-Hsi Chu, Arcadia, CA (US); Le Hoa Hong, Monterey Park, CA (US); Kai Li, Diamond Bar, CA (US)

(73) Assignee: Avery Dennison Corporation, Pasadena, CA (US)

( * ) Notice: Subject to any disclaimer, the term of this patent is extended or adjusted under 35 U.S.C. 154(b) by 650 days.

(21) Appl. No.: 11/105,762

(22) Filed: Apr. 14, 2005

(65) Prior Publication Data
US 2005/0233135 A1 Oct. 20, 2005

Related U.S. Application Data

(60) Provisional application No. 60/562,488, filed on Apr. 15, 2004.

(51) Int. Cl.
B32B 9/04 (2006.01)
C08K 3/36 (2006.01)
(52) U.S. Cl. ................. 428/447; 524/493; 106/287.14; 106/287.16
(58) Field of Classification Search ................. 428/447; 106/287.14, 287.16
See application file for complete search history.

(56) References Cited

U.S. PATENT DOCUMENTS

| 2,536,764 A | | 1/1951 | Moulton |
| 2,601,123 A | | 6/1952 | Moulton |
| 2,824,502 A | * | 2/1958 | Rockwell et al. ............. 523/172 |
| 2,963,378 A | * | 12/1960 | Palmquist et al. .......... 106/1.25 |
| 3,674,531 A | | 7/1972 | Shephard et al. ................ 117/7 |
| 3,707,751 A | | 1/1973 | Misch et al. ................... 29/132 |
| 4,117,192 A | * | 9/1978 | Jorgensen .................... 428/337 |
| 4,156,046 A | | 5/1979 | Lien et al. .................... 428/220 |
| 4,177,315 A | | 12/1979 | Ubersax ....................... 428/336 |
| 4,188,451 A | | 2/1980 | Humphrey, Jr. ............. 428/331 |
| 4,230,765 A | | 10/1980 | Takahashi et al. ........... 428/283 |
| 4,242,403 A | | 12/1980 | Mattimoe et al. ........... 428/213 |
| 4,248,932 A | * | 2/1981 | Tung et al. ................... 428/325 |
| 4,271,210 A | | 6/1981 | Yoldas ........................ 427/169 |
| 4,275,118 A | | 6/1981 | Baney et al. ................. 428/412 |
| 4,310,600 A | | 1/1982 | Cross .......................... 428/447 |
| 4,330,446 A | | 5/1982 | Miyosawa ................... 523/409 |
| 4,348,462 A | | 9/1982 | Chung ......................... 428/412 |
| 4,374,674 A | | 2/1983 | Ashby et al. ............. 106/287.12 |
| 4,390,373 A | | 6/1983 | White et al. ............. 106/287.12 |
| 4,396,650 A | * | 8/1983 | Lange et al. ................. 427/409 |
| 4,409,285 A | | 10/1983 | Swerdlow ................... 428/332 |
| 4,439,494 A | | 3/1984 | Olson ......................... 428/412 |
| 4,455,205 A | | 6/1984 | Olson et al. ............. 204/159.13 |
| 4,466,171 A | | 8/1984 | Jochems ....................... 29/571 |
| 4,478,873 A | | 10/1984 | Masso et al. .................. 427/40 |
| 4,478,876 A | | 10/1984 | Chung ......................... 427/54.1 |
| 4,478,909 A | | 10/1984 | Taniguchi et al. ........... 428/331 |
| 4,482,656 A | | 11/1984 | Nguyen et al. .............. 523/212 |
| 4,486,504 A | | 12/1984 | Chung ......................... 428/412 |
| 4,486,552 A | | 12/1984 | Niemann ..................... 523/169 |
| 4,491,508 A | | 1/1985 | Olson et al. ............. 204/159.13 |
| 4,497,861 A | | 2/1985 | Kistner ....................... 428/201 |
| 4,522,966 A | | 6/1985 | Funaki et al. ................ 524/114 |
| 4,576,864 A | | 3/1986 | Krautter et al. ............. 428/328 |
| 4,584,280 A | | 4/1986 | Nanao et al. .................. 501/80 |
| 4,609,587 A | * | 9/1986 | Giordano et al. ............ 428/325 |
| 4,609,688 A | | 9/1986 | Radisch et al. .............. 523/169 |
| 4,672,089 A | * | 6/1987 | Pricone et al. ............... 524/354 |
| 4,755,425 A | | 7/1988 | Huang ......................... 428/331 |
| 4,816,333 A | | 3/1989 | Lange et al. ................. 428/331 |
| 4,822,828 A | | 4/1989 | Swofford ...................... 522/84 |
| 4,842,941 A | | 6/1989 | Devins et al. ................ 428/412 |
| 4,844,976 A | * | 7/1989 | Huang ......................... 428/323 |
| 4,885,332 A | | 12/1989 | Bilkadi ....................... 524/714 |
| 4,931,414 A | * | 6/1990 | Wood et al. .................. 501/103 |
| 4,973,612 A | | 11/1990 | Cottington et al. ............ 522/84 |
| 5,073,404 A | | 12/1991 | Huang ......................... 427/39 |
| 5,075,348 A | | 12/1991 | Revis et al. ................... 522/84 |
| 5,086,087 A | | 2/1992 | Misev ........................... 522/84 |
| 5,104,732 A | | 4/1992 | Patel ........................... 428/331 |
| 5,104,929 A | | 4/1992 | Bilkadi ....................... 524/847 |
| 5,126,394 A | | 6/1992 | Revis et al. ................. 524/548 |
| 5,134,021 A | | 7/1992 | Hosono et al. .............. 428/213 |
| 5,162,390 A | | 11/1992 | Tilley et al. .................. 522/64 |
| 5,188,900 A | | 2/1993 | Revis et al. ................. 428/412 |

(Continued)

FOREIGN PATENT DOCUMENTS

| EP | 0 130 801 A1 | 1/1985 |
| EP | 0 193 269 A2 | 3/1986 |
| EP | 0 286 225 | 10/1988 |
| EP | 0 475 592 A2 | 3/1992 |
| EP | 0 667 880 B1 | 8/1995 |

(Continued)

OTHER PUBLICATIONS

Floch et al.; "A Scratch-Resistant Single-Layer Antireflective Coating by a Law Temperature Sol-Gel Route"; SPIE; vol. 1758 Sol-Gel Optics 11 (1992); pp. 135-149.
Lewis et al.; "Ultraviolet-Curable, Abrasion-Resistant, and Weatherable Coatings with Improved Adhesion"; *Journal of Applied Polymer Sciences*; vol. 42 (1991); pp. 1551-1568.
Yoshida et al.; "A Method for Preparing New Elongated-Shaped Silica Sols"; *Bul. Chem. Soc. Jpn.*; vol. 64 (1991); pp. 1682-1683.
International Search Report for PCT/US2005/012933 mailed Oct. 24, 2005.

*Primary Examiner*—Margaret G Moore

(57) ABSTRACT

The present invention relates to dew resistant coatings and articles having the dew resistant coating adhered thereto. The dew resistant coatings comprise elongate silica particles. These coating are useful on articles or surfaces used in outdoor applications and articles and surfaces used in moist indoor environments.

7 Claims, 2 Drawing Sheets

U.S. PATENT DOCUMENTS

| | | | |
|---|---|---|---|
| 5,214,085 A | 5/1993 | Patel et al. | 524/102 |
| 5,221,497 A | 6/1993 | Watanabe et al. | 252/313.2 |
| 5,221,560 A | 6/1993 | Perkins et al. | 427/515 |
| 5,227,240 A | 7/1993 | Tilley et al. | 428/412 |
| 5,232,964 A | 8/1993 | Evans et al. | 524/94 |
| 5,242,719 A | 9/1993 | Medford et al. | 427/515 |
| 5,260,350 A | 11/1993 | Wright | 522/42 |
| 5,262,475 A | 11/1993 | Creasy | 525/58 |
| 5,274,159 A | 12/1993 | Pellerite et al. | 556/485 |
| 5,296,295 A | 3/1994 | Perkins et al. | 428/412 |
| 5,316,791 A | 5/1994 | Farber et al. | 427/464 |
| 5,318,850 A | 6/1994 | Pickett et al. | 428/412 |
| 5,342,683 A | 8/1994 | Rigamonti et al. | 428/331 |
| 5,346,767 A | 9/1994 | Tilley et al. | 428/412 |
| 5,366,545 A | 11/1994 | Yajima et al. | 106/286.4 |
| 5,374,483 A | 12/1994 | Wright | 428/412 |
| 5,385,955 A | 1/1995 | Tarshiani et al. | 522/31 |
| 5,409,965 A | 4/1995 | Hosokawa et al. | 522/83 |
| 5,411,787 A | 5/1995 | Kulkarni et al. | 428/195 |
| 5,426,131 A | 6/1995 | Katsamberis | 522/16 |
| RE34,992 E | 7/1995 | Revis et al. | 522/84 |
| 5,464,900 A | 11/1995 | Stofko, Jr. et al. | 524/838 |
| 5,466,491 A | 11/1995 | Factor et al. | 427/515 |
| 5,468,789 A | 11/1995 | Lewis et al. | 524/99 |
| 5,487,920 A | 1/1996 | Lopata et al. | 427/489 |
| 5,503,935 A | 4/1996 | Patel | 428/412 |
| 5,559,163 A | 9/1996 | Dawson et al. | 522/75 |
| 5,565,518 A | 10/1996 | Stofko, Jr. et al. | 524/837 |
| 5,585,186 A | 12/1996 | Scholz et al. | 428/412 |
| 5,597,512 A | 1/1997 | Watanabe et al. | 252/315.6 |
| 5,614,321 A | 3/1997 | Medford et al. | 428/417 |
| 5,639,546 A | 6/1997 | Bilkadi | 428/331 |
| 5,651,921 A | 7/1997 | Kaijou | 252/309 |
| 5,674,941 A | 10/1997 | Cho et al. | 525/102 |
| 5,677,050 A | 10/1997 | Bilkadi et al. | 428/331 |
| 5,679,458 A | 10/1997 | Cho et al. | 428/412 |
| 5,708,048 A | 1/1998 | Medford et al. | 522/64 |
| 5,712,324 A | 1/1998 | Lilly | 522/75 |
| 5,712,325 A | 1/1998 | Lewis et al. | 522/83 |
| 5,714,532 A | 2/1998 | Osterholtz et al. | 524/114 |
| 5,719,206 A | 2/1998 | Mihoya et al. | 523/212 |
| 5,723,175 A | 3/1998 | Scholz et al. | 427/161 |
| 5,739,181 A | 4/1998 | Khudyakov et al. | 523/213 |
| 5,753,373 A | 5/1998 | Scholz et al. | 428/429 |
| 5,760,126 A | 6/1998 | Engle et al. | 524/516 |
| 5,766,739 A | 6/1998 | Funaki et al. | 428/201 |
| 5,766,772 A | 6/1998 | Ciocca et al. | 428/516 |
| 5,783,115 A | 7/1998 | Bilkadi et al. | 252/582 |
| 5,811,472 A | 9/1998 | Patel | 522/14 |
| 5,820,978 A * | 10/1998 | Huang | 428/331 |
| 5,827,923 A | 10/1998 | Medford et al. | 524/854 |
| 5,840,388 A | 11/1998 | Karger et al. | 428/36.91 |
| 5,846,650 A | 12/1998 | Ko et al. | 428/336 |
| 5,958,514 A | 9/1999 | Havey et al. | 427/386 |
| 5,958,598 A | 9/1999 | Khudyakov et al. | 428/447 |
| 5,990,188 A | 11/1999 | Patel et al. | 522/28 |
| 5,997,621 A | 12/1999 | Scholz et al. | 106/13 |
| 5,998,525 A * | 12/1999 | Wang et al. | 524/425 |
| 6,001,163 A | 12/1999 | Havey et al. | 106/287.13 |
| 6,013,372 A | 1/2000 | Hayakawa et al. | 428/411.1 |
| 6,015,843 A | 1/2000 | Van Vlasselaer | 522/84 |
| 6,040,053 A | 3/2000 | Scholz et al. | 428/412 |
| 6,046,254 A | 4/2000 | Kneale | 523/169 |
| 6,127,462 A | 10/2000 | Chen et al. | 524/114 |
| 6,132,861 A | 10/2000 | Kang et al. | 428/323 |
| 6,156,409 A | 12/2000 | Doushita et al. | 428/143 |
| 6,176,906 B1 | 1/2001 | Lee et al. | 106/13 |
| 6,201,056 B1 | 3/2001 | Zhu | 524/493 |
| 6,210,790 B1 | 4/2001 | Crivello | 428/325 |
| 6,221,938 B1 | 4/2001 | Chen et al. | 524/114 |
| 6,238,798 B1 | 5/2001 | Kang et al. | 428/421 |
| 6,245,833 B1 | 6/2001 | Kang et al. | 523/203 |
| 6,251,523 B1 | 6/2001 | Takahashi et al. | 428/428 |
| 6,265,061 B1 * | 7/2001 | Kang et al. | 428/323 |
| 6,287,683 B1 | 9/2001 | Itoh et al. | 428/336 |
| 6,299,799 B1 | 10/2001 | Craig et al. | 252/500 |
| 6,303,229 B2 | 10/2001 | Takahama et al. | 428/447 |
| 6,329,058 B1 | 12/2001 | Arney et al. | 428/403 |
| 6,346,331 B2 | 2/2002 | Harvey et al. | 428/429 |
| 6,352,758 B1 | 3/2002 | Huang et al. | 428/143 |
| 6,358,601 B1 | 3/2002 | Bilkadi | 428/323 |
| 6,369,139 B1 | 4/2002 | Osterholtz et al. | 524/114 |
| 6,376,064 B1 | 4/2002 | Gasworth et al. | 428/331 |
| 6,376,576 B2 | 4/2002 | Kang et al. | 523/202 |
| 6,379,776 B1 | 4/2002 | Tada et al. | 428/149 |
| 6,387,519 B1 | 5/2002 | Anderson et al. | 428/447 |
| 6,391,999 B1 | 5/2002 | Crivello | 528/12 |
| 6,394,613 B1 | 5/2002 | Hatakeyama et al. | 359/507 |
| 6,420,020 B1 | 7/2002 | Yamazaki et al. | 428/336 |
| 6,425,670 B1 | 7/2002 | Komatsu et al. | 359/507 |
| 6,432,526 B1 | 8/2002 | Arney et al. | 428/328 |
| 6,451,408 B1 | 9/2002 | Haunschild et al. | 428/143 |
| 6,465,108 B1 | 10/2002 | Kamitani et al. | 428/448 |
| 6,497,961 B2 | 12/2002 | Kang et al. | 428/421 |
| 6,514,574 B1 | 2/2003 | Valeri et al. | 427/515 |
| 6,517,687 B1 | 2/2003 | Iacovangelo | 204/192.26 |
| 6,538,092 B1 | 3/2003 | Terry et al. | 528/26 |
| 6,569,520 B1 | 5/2003 | Jacobs | 428/330 |
| 6,593,417 B1 | 7/2003 | Anderson et al. | 524/588 |
| 6,610,777 B1 | 8/2003 | Anderson et al. | 524/588 |
| 6,623,791 B2 | 9/2003 | Sadvary et al. | 427/140 |
| 6,627,682 B1 | 9/2003 | Chaves et al. | 523/406 |
| 6,635,341 B1 | 10/2003 | Barancyk et al. | 428/323 |
| 6,657,001 B1 | 12/2003 | Anderson et al. | 524/588 |
| 6,696,143 B1 | 2/2004 | La Point | 428/216 |
| 6,716,513 B1 | 4/2004 | Hasuo et al. | 428/141 |
| 6,723,440 B2 | 4/2004 | Valeri et al. | 428/447 |
| 6,783,845 B2 | 8/2004 | Zhang et al. | 428/325 |
| 7,255,815 B2 * | 8/2007 | Krause et al. | 264/15 |
| 2003/0032721 A1 | 2/2003 | Terry et al. | 524/837 |
| 2003/0203991 A1 | 10/2003 | Schottman et al. | 523/334 |
| 2004/0077768 A1 | 4/2004 | Greenwood | 524/492 |
| 2004/0097600 A1 | 5/2004 | Greenwood et al. | 516/86 |
| 2004/0116585 A1 | 6/2004 | Ambrose et al. | 524/492 |
| 2004/0157960 A1 * | 8/2004 | Rowe | 523/172 |
| 2005/0010589 A1 * | 1/2005 | Novak et al. | 707/102 |

FOREIGN PATENT DOCUMENTS

| | | |
|---|---|---|
| EP | 0 978 494 A1 | 2/2000 |
| EP | 0 759 950 B1 | 5/2000 |
| EP | 1 052 541 | 11/2000 |
| EP | 1 066 878 | 1/2001 |
| EP | 1 106 574 | 6/2001 |
| EP | 1 136 527 | 9/2001 |
| EP | 0 993 371 B1 | 12/2003 |
| EP | 1 570 980 | 9/2005 |
| GB | 2 036 053 A | 6/1980 |
| GB | 2 061 986 A | 5/1981 |
| GB | 2 230 783 A | 10/1990 |
| JP | 07 327522 | 12/1995 |
| JP | 10-37135 | 2/1998 |
| JP | 2000-212473 | 2/2000 |
| JP | 2001-40245 | 2/2001 |
| WO | 97/31357 | 8/1997 |
| WO | 98/55555 | 12/1998 |
| WO | 99/00250 | 1/1999 |
| WO | 99/07789 | 2/1999 |
| WO | 99/57375 | 11/1999 |
| WO | 01/18082 A1 | 3/2001 |
| WO | 03/053719 A2 | 7/2003 |

* cited by examiner

US 7,504,156 B2

DEW RESISTANT COATINGS

This application claims the benefit of provisional application Ser. No. 60/562,488 filed on Apr. 15, 2004, which is hereby incorporated herein by reference in its entirety.

FIELD OF THE INVENTION

The present invention relates to dew resistant coatings and articles having the dew resistant coating adhered thereto. The dew resistant coatings are useful on articles or surfaces used in outdoor applications and are particularly useful on retroreflective articles.

BACKGROUND OF THE INVENTION

There exists a need for imparting dew resistance to transparent substrates such as windshields, lenses, goggles, and windows, and reflective substrates such as mirrors and retroreflective traffic signs. While retroreflective traffic signs currently provide optimum levels of headlight reflectivity to motorists, accumulation of dewdrops on the surface of the retroreflective sign can result in potentially catastrophic "blackouts" in which the signs are ineffective in providing vital information to motorists. This problem has been described by John A. Wagner in the Florida Sate Department of Transportation Report "HPR Research Study M29-82", October 1989. In certain parts of the world, the climate is such that moisture from the atmosphere readily condenses onto surfaces when the temperature of the surface drops below the dew point, the temperature at which the air is fully saturated with water vapor and below which precipitation of water in the form of "dew" occurs. When formed on the surface of mirrors and retroreflective surfaces, these dewdrops scatter the incident light, resulting in the loss of reflectivity or "blackouts".

One method of preventing condensation and the formation of dewdrops is to heat the surface of the substrate to a temperature above the dew point. U.S. Pat. No. 5,087,508 describes the use of phase change materials in a thermal reservoir located behind the outer layer of a display sign. The phase change material undergoes at least one phase change, e.g., from liquid to solid state or from one crystalline state to another, between about −20° C. and about 40° C. During periods of falling ambient temperature, the thermal reservoir will yield heat, thereby warming the outer layer of the display sign. European Patent Application 155,572 describes a device for preventing the formation of dew and frost on retroreflective road sign carriers in which a thermal radiator is arranged above and in front of the road sign. Neither of these devices provides a complete solution to the problems associated with the formation of dew. The device of U.S. Pat. No. 5,087,508 requires "recharging" of the phase change material at higher temperatures, while the device of EP 155,572 simply minimizes dew formation by minimizing radiative cooling of sign surfaces to the night sky.

Surfactants have been used to obtain anti-fog properties on the surface of polymer films. The surfactants used are generally small molecules or oligomeric in nature, and present in relatively low concentrations. Examples of surfactants used for anti-fog applications in food packaging and greenhouse products include those described in U.S. Pat. Nos. 4,136,072; 4,609,688; 5,451,460; 5,766,772; 5,846,650; and 6,296,694 and EP 1,110,993. In general, the surfactant coatings are susceptible to water washing due to the low concentrations of surface active molecules. In addition, many of the anti-fog films are not dew resistant and exhibit only a modest decrease in surface water contact angles.

Polymeric forms of hydrophilic surface agents have been disclosed as being useful for anti-fog films. U.S. Pat. No. 5,877,254 describes an anti-fog and scratch resistant polyurethane composition that include an isocyanate prepolymer, a hydrophilic polyol and an isocyanate-reactive surfactant. U.S. Pat. No. 4,080,476 describes an anti-fog coating for optical substrates wherein the coating comprises a polymerized monomer of, for example, 2-acrylamido-2-methyl propane sulfonic acid. International Publication WO 99/07789 describes the use of siloxane derivatives of polyetheralcohols as an anti-fog additive to a polyolefin prior to formation of a polyolefin film. Many of the prior art coatings do not provide a consistent long-lasting anti-fog coating. Rather, the anti-fog properties of these coatings fail after repeated washings with water.

SUMMARY OF THE INVENTION

A dew-resistant coating having particular utility for retroreflective articles is described. The dew-resistant coating is obtainable from a film-forming inorganic or inorganic/organic hybrid composition comprising silica wherein the silica particles comprise elongate particles having an aspect ratio of greater than 1. In one embodiment, the aspect ratio is greater than 2.

In one embodiment the invention is directed to a dew-resistant coating comprising at least about 75% by weight of elongate silica particles having a width of about 9 to about 15 nanometers and a length of about 40 to about 300 nanometers. The coating may optionally include an organic binder.

The dew resistant coatings of the present invention are useful for applications that include, but are not limited to, retroreflective and graphic signage, automotive interior glass, transportation industry paint, i.e., aviation, train and automobile paint, boat and ship bottoms, lubricous pipe coatings, freezer windows, clear plastic packaging, chromatography support, medical equipment surface treatment, bathroom mirrors, shower enclosures, and eyeglasses.

One embodiment of the invention is directed to a retroreflective article comprising a substrate and a coating provided on at least a portion of a surface of the substrate that is exposed to moist air, the coated portion being retroreflective and the coating comprising elongate silica particles having an aspect ratio of greater than 1. Retroreflective articles to which the coating of the present invention may be applied include raised pavement markers having one or more retroreflective elements on the surface, traffic signs, license plates or self-adhesive stickers bearing visually observable information. In one embodiment, the coating on at least a portion of the retroreflective article comprises at least 75% by weight of elongate silica.

Another embodiment of the invention is directed to a method of imparting dew-resistance to a retroreflective article, the method comprising: providing a retroreflective article having a surface; preparing a coating composition comprising elongate silica particles having a width of about 9 to about 15 nanometers and a length of about 40 to about 300 nanometers; applying the coating composition to at least a portion of the surface of the retroreflective article; and heating the coating composition to form a dew-resistant coating.

DETAILED DESCRIPTION OF THE INVENTION

Figure 1:
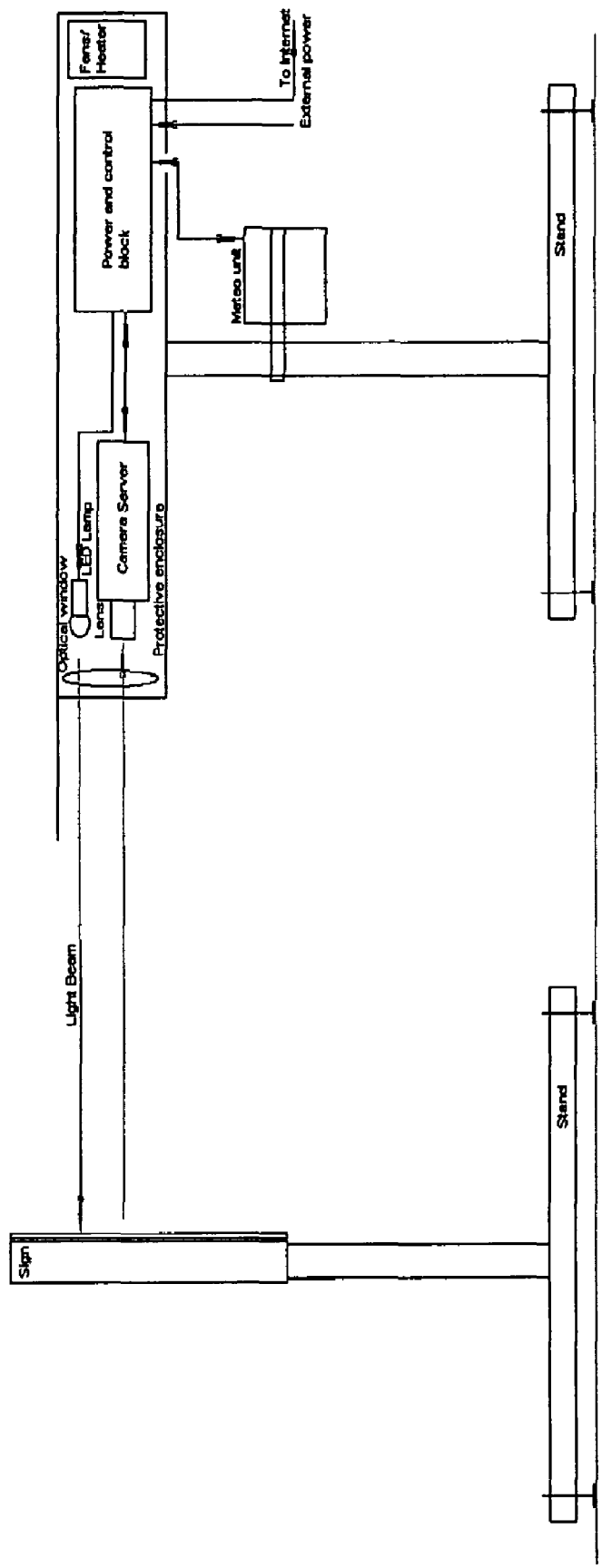
FIG. 1 is a schematic diagram of an apparatus used to measure dew resistance of an article having the dew resistant coating of the invention coated thereon.

The dew-resistant coating of the present invention comprises elongate silica fine particles. The elongate silica particles are coated or grafted onto the surface of the substrate. The substrate is generally glass or a polymeric film. The dew-resistant coating can be transparent. When the substrate to which the dew-resistant coating is applied is a retroreflective film, a transparent dew-resistant coating is required.

The silica useful in the present invention comprises elongate particle silica having an aspect ratio that is greater than 1.0. In one embodiment, the aspect ratio is greater than 2.0. As used herein, the term "aspect ratio" means the ratio of the length of the particle to the width. In one embodiment, the silica particles have an average width (diameter) of about 9 to about 15 nanometers and an average length of about 40 to about 300 nanometers. The elongate silica particles may be dispersed in an alcohol or in water. Commercially available elongate silica includes those available from Nissan Chemical Industries under the trade designations SNOWTEX UP and SNOWTEX OUP. The silica may also comprise string-of-pearls silica particles, which are chain silica particles available from Nisson Chemical under the trade designation SNOWTEX-PS. The solvent in which the particles are dispersed may be water, methanol, ethanol, isopropanol, etc.

In one embodiment, the coating composition comprises at least 75% by weight fine elongate silica particles. In other embodiments, the coating composition comprises at least 80%, or at least 90%, or at least 95% by weight fine elongate silica particles. In one embodiment, the coating composition comprises fine elongate silica particles and fine spherical particles having an average diameter of less than about 50 nanometers. The spherical particles may be provided in a colloidal dispersion of silica in a solvent that is compatible with the solvent of the elongate silica particles. For example, the spherical silica particles used may comprise Snowtex IPA-ST-MA from Nissan Chemical Industries, which is a silica sol of spherical silica particle having an average particle diameter of about 17-23 nanometers dispersed in isopropyl alcohol. A useful ratio of elongate silica particles to spherical silica particles is in the range of about 100:0 (i.e. 100% elongate silica) to about 70:30. In one embodiment, the ratio of elongate silica particles to spherical particles is in the range of about 100:0 to about 90:10.

In one embodiment of the present invention, the coating composition comprises fine elongate silica particles and an organic binder. The organic binder may be present in an amount of about 0 by weight to about 10% by weight based on the total solids of the coating composition. In one embodiment, the organic binder may be present in an amount of about 4% to about 8%, or about 15% to about 25% by weight. The organic binder may comprise hydrolysis products and partial condensates of one or more silane compounds. Useful silane compounds include, but are not limited to epoxy-functional silanes. Examples of such epoxy-functional silanes are glycidoxy methyltrimethoxysilane, 3-glycidoxypropyltrihydroxysilane, 3-glycidoxypropyl-dimethylhydroxysilane, 3-glycidoxypropyltrimeth-oxysilane, 3-glycidoxypropyl triethoxysilane, 3-glycidoxypropyl-dimethoxymethylsilane, 3-glycidoxypropyldimethylmethoxysilane, 3-glycidoxypropyltributoxysilane, 1,3-bis(glycidoxypropyl) tetramethyldisiloxane, 1,3-bis(glycidoxypropyl)tetramethoxydisiloxane, 1,3-bis(glycidoxypropyl)-1,3-dimethyl-1,3-dimethoxydisiloxane, 2,3-epoxypropyl-trimethoxysilane, 3,4-epoxybutyltrimethoxysilane, 6,7-epoxyheptyl-trimethoxysilane, 9,10-epoxydecyltrimethoxysilane, 1,3-bis(2,3-epoxypropyl) tetramethoxydisiloxane, 1,3-bis(6,7-epoxyheptyl)tetramethoxydisiloxane, 2-(3,4-epoxycyclohexyl)ethyltrimethoxysilane, and the like.

Other useful silanes include methyltrimethoxysilane, ethyltrimethoxysilane, propyltrimethoxysilane, butyltrimethoxysilane, isobutyltrimethoxysilane, hexyltrimethoxy silane, octyltrimethoxysilane, decyltrimethoxysilane, cyclohexyltrimethoxysilane, cyclohexylmethyltrimethoxysilane, 3-methacryloxypropyltrimethoxysilane, vinyltrimethoxysilane, allyltrimethoxysilane, dimethyldimethoxysilane, 2-(3-cyclohexenyl)ethyltrimethoxysilane, 3-cyanopropyltrimethoxysilane, 3-chloropropyltrimethoxysilane, 2-chloroethyltrimethoxysilane, phenethyltrimethoxysilane, 3-mercaptopropyltrimethoxysilane, 3-aminopropyltrimethoxysilane, phenyltrimethoxysilane, 3-isocyanopropyltrimethoxysilane, N-(2-aminoethyl)-3-aminopropyltrimethoxysilane, 4-(2-aminoethylaminomethyl) phenethyltrimethoxysilane, chloromethyltriethoxysilane, 2-chloroethyltriethoxysilane, 3-chloropropyltriethoxysilane, phenyltriethoxysilane, ethyltriethoxysilane, propyltriethoxysilane, butyltriethoxysilane, isobutyltriethoxysilane, hexyltriethoxysilane, octyltriethoxysilane, decyltriethoxysilane, cyclohexyl-triethoxysilane, cyclohexylmethyltriethoxysilane, 3-methacryloxypropyltriethoxysilane, vinyltriethoxysilane, allyltriethoxysilane, [2-(3-cyclohexenyl)ethyltriethoxysilane, 3-cyanopropyltriethoxysilane, 3-methacrylamidopropyltriethoxysilane, 3-methoxypropyltrimethoxysilane, 3-ethoxypropyltrimethoxysilane, 3-propoxypropyltrimethoxysilane, 3-methoxyethyltrimethoxysilane, 3-ethoxyethyltrimethoxysilane, 3-propoxyethyltrimethoxysilane, 2-[methoxy(polyethyleneoxy)propyl]heptamethyl trisiloxane, [methoxy(polyethyleneoxy)propyl]trimethoxysilane, [methoxy(polyethyleneoxy)ethyl]trimethoxysilane, [methoxy(polyethyleneoxy) propyl]triethoxysilane, [methoxy(polyethyleneoxy)ethyl]triethoxysilane, and the like.

The organic binder may comprise a polymer that is hydrophilic.

The dew resistant coating of the present invention may comprise a monolayer or a multilayer coating. In one embodiment, a tie layer is applied to the substrate to improve the adhesion of the outer silica containing coating.

In one embodiment, the dew resistant coating comprises a first layer comprising fine spherical particles and an organic binder and a second, outer layer, comprising fine elongate silica. In another embodiment, the dew resistant coating comprises a first layer comprising fine elongate silica and an organic binder and a second, outer layer comprising a photocatalytic layer.

The photocatalytic layer generally comprises $TiO_2$ particles. Photocatalytic compositions are disclosed in U.S. Pat. Nos. 6,228,480 and 6,407,033 to Nippon Soda Company, the disclosures of which are incorporated by reference herein. The second photocatalytic layer affords additional self-cleaning properties along with increased hydrophilicity upon UV irradiation.

In one embodiment, photocatalytic nanoparticles are incorporated into a dew resistant coating composition that is applied to the substrate in a monolayer. The coating composition may comprise metal oxide particles in addition to the fine elongate silica particles. Such metal oxide particle may be used to obtain a desired refractive index or to obtain desired photoactivity. The elongate silica particles may be used in combination with other metals or metal oxides such as titania, zirconia, tin oxide, antimony oxide, iron oxide, lead oxide, needle $TiO_2$, bayerite ($Al(OH)_3$) and/or bismuth oxide to incorporate other adjunct properties including color, conductivity (thermal and/or electrical), abrasion resistance, etc.

In one embodiment, the coating composition comprises elongate silica particles, an organic binder and at least one surfactant. Useful surfactants include alkoxy siloxane-based surfactants, ethoxylated fatty alcohols such as lauryl alcohol, myristyl alcohol, palmityl alcohol and stearyl alcohol; polyethylene oxides; block copolymers of propylene oxide and ethylene oxide; alkyl polyethoxy ethanols; polyethylene lauryl ether; polyethylene stearate; ethoxylated nonylphenol; sorbitan ester of fatty acid; polyethylene sorbitan monostearate; polyglycerol esters of fatty acids such as lauryl acid, palmetic acid, stearic acid, oleic acid, linoleic acid and linolenic acid; polyoxyethylene distearate; polyoxyethylene sorbitan tristearate; ethylene glycol monostearate; sodium lauryl ether sulfate; ethoxylated amine; ethoxylated acetylenic alcohol; sodium sulfosuccinate; sodium dodecyl benzene sulfonate; fluorosurfactants; acetylenics and combinations of two or more thereof. The surfactant may be present in an amount of 0 to 10% by weight of the coating composition.

When an organic binder is used, the coating composition may be cured via free radical, thermal, infrared, electron beam or ultraviolet radiation polymerization. For UV curable compositions, useful photoinitiators include sulfonium or iodonium salts such as SARCAT CD1010, SARCAT CD1011 and SARCAT CD1012 (available from Sartomer) and CYRACURE UVI 6974 available from Dow Chemical, IRGACURE 651, 184 and 1700 and DAROCURE 1173, available from CIBA-GEIGY; as well as GENOCURE LBP available from Rahn; and ESACURE KIP150 available from Sartomer; [4-[(2-hydroxytetradecyl)oxy]-phenyl]phenyliodonium hexafluoroantimonate, benzophenone, benzyldimethyl ketal, isopropyl-thioxanthone, bis(2,6-dimethoxybenzoyl)(2,4,4-trimethylpentyl) phosphineoxide, 2-hydroxy-2-methyl-1-phenyl-1-propanone, diphenyl(2,4,6-trimethybenzoyl) phosphine oxides, 1-hydroxycyclohexyl phenyl ketone, 2-benzyl-2-(dimethyl-amino)-1-4-(4-morpholinyl)phenyl-1-butanone, alpha,alpha-dimethoxy-alpha-phenylacetophenone, 2,2-diethoxyacetophenone, 2-methyl-1-4-(methylthio) phenyl-2-(4-morpholinyl)-1-propanone, 2-hydroxy-1-4-(hydroxyethoxy)phenyl-2-methyl-1-propanone. Photosensitizers may be used in combination with the photoinitiator. Examples of photosensitizers include phthalimide derivatives, isopropylthioxanthone and carbazole compounds.

The coating composition of the present invention can be applied to substrates by conventional methods, including flow coating, spray coating, curtain coating, dip coating, spin coating, roll coating, etc. to form a continuous surface film or as a pattern, as desired. In one embodiment, the coat weight of the applied coating is about 1 gsm or less.

Any substrate compatible with the coating composition can be coated with the dew resistant coating. For example, plastic materials, wood, paper, metal, glass, ceramic, mineral based materials, leather and textiles may be coated with the dew resistant coating. Plastic substrates to which the dew resistant coating of the present invention may be applied include acrylic polymers, poly(ethyleneterephthalate), polycarbonates, polyamides, polyimides, copolymers of acrylonitrile-styrene, styrene-acrylonitrile-butadiene copolymers, polyvinyl chloride, butyrates, polyethylene and the like. Transparent polymeric and glass materials coated with these compositions are useful as flat or curved enclosures, such as windows, liquid crystal display screens, skylights and windshields, especially for transportation equipment.

The dew resistant coating composition is particularly useful when applied to retroreflective sheeting. The transparent dew resistant coating enables the underling retroreflective sheeting to maintain its retroreflectivity and decreases or eliminates the likelihood of a "blackout" condition in moist environments. This may be achieved by using a dew resistant coated glass or a transparent plastic film that is adhered as an overlaminate to a retroreflective sign. Alternatively, this may be directly incorporated onto the top surface of a retroreflective article. Retroreflective substrates include raised pavement markers having one or more retroreflective elements on the surface, traffic signs, license plates or self-adhesive stickers bearing visually observable information.

In one embodiment, the dew resistant coating is applied to at least a portion of the surface of a retroreflective sheet. The surface of the retroreflective sheet may comprise an acrylate polymer. In one embodiment, the surface of the retroreflective sheet to which the dew resistant coating is applied comprises a butyl acrylate/methylmethacrylate copolymer.

In one embodiment, a removable protective layer is applied over the dew resistant coating to prevent damage to the dew resistant coating during storage, transport and application to the underlying substrate. The removable protective layer may comprise a polymeric film. In one embodiment, the protective layer comprises a water soluble or water miscible polymeric coating. Examples of such polymers include polyethylene oxide, polyvinyl alcohol, polyacrylic acid, alkyl metal silicate, polyvinyl pyrrolidone, (poly)hydroxyethyl methacrylate, and combinations thereof.

TESTING METHODS

Coat Thickness

The coat thickness for film samples coated onto plastic substrates are determined via the cross-section method wherein a 2 micrometer thick slice is cut in the traverse direction through the dew-resistant coating and the film support using a microtome (RMC Rotary Microtome MT 990) equipped with a diamond knife (Delaware Diamond Knife). The microtome is set to operate at −10° C. and a cutting speed of about 10 mm/sec. An Olympus BX 60 optical microscope is used to observe the cross-section and to measure the coat thickness in micrometers via a digital camera (resolution 800×600) and the software package Image Pro-Plus at total magnification of 1000×. A second method used to determine coat weight is X-ray florescence spectrometry, which measures silicon for a silica-based coating, aluminum for an alumina-based coating, etc. A bench-top Oxford Lab-X 3000 XRF analyzer (Oxford Instruments) is used to measure dry coat weight of silica based coatings. Coated samples are die-cut into 3.5 cm diameter disks to measure the quantity of silicon present.

Contact Angle:

The contact angle between the surface of the coated substrate and a droplet of water is an indicator of the hydrophilicity of the coating. The lower the contact angle, the better the hydrophilic properties of the coating. The hydrophilicity of the film surface is measured using an FTA 200 dynamic contact angle goniometer available from First Ten Angstroms Corp. equipped with a Pelco video camera (PCHM 575-4). Contact angle measurements are taken using a 4 microliter water droplet in ambient air humidity at time intervals of 1 second, 5 seconds, and 10 seconds.

Water Wash Resistance

Coated samples are put in a bottle containing water and placed on a mechanical roller (available from Norton Chemical Process Products Division, Akron, Ohio) for 12 hours. Samples are then removed, re-washed under running water, dried and tested appropriately for anti-fog, dew resistance and/or contact angle (hydrophilicity).

Anti-Fog:

The anti-fog property of the coatings is screened by blowing a breath of air onto the surface of the test sample to determine if any haze develops. The sample may also be evaluated by putting the test surface face down, 1 inch away from the top of a boiling beaker of water. If no haze or dew is observed after 30 seconds, the sample is rated to have anti-fog properties.

Dew Resistance:

An outdoor dew resistance testing apparatus schematically represented in FIG. 1 is used to measure dew resistance outdoors. The dew-resistant coated retroreflective samples are laminated onto a metallic traffic sign. Dew is generated naturally by heat loss to the atmosphere provided by satisfactory meteorological conditions. The digital camera (IQEye3 camera server) is accompanied by an axial illumination system (12V white LED array) and a Rotronic 3 meteorological terminal that is linked to the camera server via a local serial bus. The outdoor dew tester transmits, at specified time intervals, images and meteorological data including dew point, relative humidity and air temperature to a data server via TCP communication protocol and the Internet. Reflectivity data for the dew resistant coated retroreflective samples is integrated from the bitmap histograms and compared to a sample of the uncoated retroreflective sample and plotted versus time. Each reflectivity data set includes measured meteorological parameters such as air temperature, air relative humidity and dew point.

Percent Blackout

For a given dew event, the percent blackout of a dew resistant coated sign is calculated as the number of hours the sign loses its reflective properties (loses more than 50% of its original reflectivity) divided by the number of hours the control (uncoated sign) loses its reflective properties, multiplied by 100. The apparatus used to measure the reflective properties of the sign is described above with reference to Outdoor Dew Resistance testing.

Xenon Weathering:

Xenon weathering testing is carried out with an Atlas Ci5000 Xenon Arc Weather-Ometer (Atlas Electric Devices Company, Chicago, Ill.) according to ASTM G155-1 with two light cycle segments. For both light cycles, irradiance is the same: 0.35 watts/$M^2$ at 340 nm, with black panel temperature set at 63° C., chamber temperature at 40° C., and relative humidity at 50%. The first light cycle is 102 minutes, with no water spray and the second light cycle is 18 minutes with water spray on the sample surface.

QUV Weathering:

A QUV Accelerated Weathering Tester (Q-Panel Lab Products, Cleveland, Ohio) is used to carry out the testing according to ASTM G-154 procedures. A UVA-340 lamp with typical irradiance of 0.77 watts/$m^2$ or a UVB-313 lamp with typical irradiance of 0.63 watts/$m^2$ is applied in the test. The UVA-340 lamp has similar spectral power distribution as sunlight. The typical cycles include an 8 hour UV light cycle at 60° C. black panel temperature and a 4 hour condensation cycle at 50° C. black panel temperature.

Retroreflectivity:

A hand-held RetroSign retroreflectometer type 4500 (Danish Electronics, Light & Acoustics of Denmark) is used to measure retroreflectivity according to ASTM D4956-01 Standard Specification for Retroreflective Sheeting for Traffic Control. The retroreflectometer measures with a fixed entrance angle at −4° C. and observation angle of 0.2°C.

Mandrel Test:

The Mandrel test accelerates cracking of the coating, which contributes to increased haze, and therefore, decreases retroreflectivity. Retroreflective sheeting samples with adhesive backing are cut in 2 cm (cross direction)×4 cm (machine direction) strips and applied to a glass rod having a 1 inch diameter. Hand applied pressure is used to wrap the sample around the rod. Tape may be used to further secure the sample strip ends to the glass rod. The rod is then placed in an apparatus for temperature cycling and examined under optical microscope for extent of cracking. A scale of 1 to 5 is used to rate the extent of cracking observed after thermal cycling. The temperature cycling is as follows:

| Step No. | Initial Values of Each Step | | Graded Target | | Time |
| --- | --- | --- | --- | --- | --- |
| | Temperature (° C.) | Humidity (%) | Temperature (° C.) | Humidity (%) | Setting (hours) |
| 1 | Room | Room | 20 | 20 | 1 |
| 2 | 20 | 20 | | | 2 |
| 3 | 20 | 20 | 60 | 20 | 1 |
| 4 | 60 | 20 | | | 2 |
| 5 | 60 | 20 | 60 | 80 | 1 |
| 6 | 60 | 80 | | | 2 |
| 7 | 60 | 80 | −10 | 0 | 1 |
| 8 | −10 | 0 | | | 2 |

In order to further illustrate the present invention, the following examples are given. However, it is to be understood that the examples are for illustrative purposes only and are not to be construed as limiting the scope of the present invention.

EXAMPLES

Examples 1-14

A solution of colloidal elongate silica in isopropyl alcohol (Snowtex IPA-ST-UP from Nissan Chemical Industries, 15% by wt. $SiO_2$ in isopropanol) is coated onto retroreflective sheeting (Avery Dennison T-7500 Prismatic Grade Reflective Sheeting) or a polyethylene terephthalate (PET) substrate at various coat weights (wet) and at various percent solids of the elongate silica is isopropyl alcohol. The solution is coated using a Sheen automatic coater with drawbars of 1 and 0.5 gauges. The coated substrates are placed in an air convection oven and heated at 75° C. for 15 minutes. Table 1 below shows the measured contact angle and retroreflectivity of the coated substrates.

Also presented in Table 1 is Comparative Example 14 in which elongate silica in MEK solvent is used to coat a retroreflective sheet. The resulting coating has a high contact angle. While not wishing to be bound by theory, it is believed that the high contact angle is the result of the hydrophobiza tion treatment of the silica particles surface carried out to enhance the solution stability of the MEK solvent suspension.

TABLE 1

| Example | Silica | % Solids | Substrate | Coat Thickness (wet) mil | Contact Angle (5 sec.) | Initial Reflectivity (cd/lux/m$^2$) |
|---|---|---|---|---|---|---|
| 1 | IPA-ST-UP | 15 | T7500 | 1 | 10.4 | 1234 |
| 2 | IPA-ST-UP | 10 | T7500 | 1 | 8.1 | 1280 |
| 3 | IPA-ST-UP | 5 | T7500 | 1 | 10.4 | 1229 |
| 4 | IPA-ST-UP | 1 | T7500 | 1 | 30.5 | 1277 |
| 5 | IPA-ST-UP | 0.1 | T7500 | 1 | 51.2 | 1172 |
| 6 | IPA-ST-UP | 15 | PET | 1 | 10.4 | — |
| 7 | IPA-ST-UP | 15 | PET | 0.5 | 7.7 | — |
| 8 | IPA-ST-UP | 10 | PET | 1 | 4.4 | — |
| 9 | IPA-ST-UP | 10 | PET | 0.5 | 4.7 | — |
| 10 | IPA-ST-UP | 5 | PET | 1 | 10.4 | — |
| 11 | IPA-ST-UP | 5 | PET | 0.5 | 5.4 | — |
| 12 | IPA-ST-UP | 1 | PET | 1 | 11.0 | — |
| 13 | IPA-ST-UP | 1 | PET | 0.5 | 21.1 | — |
| Comp. 14 | MEK-ST-UP | 15 | T7500 | 1.0 | 39.8 | N/A |

Example 15-18

Colloidal elongate silica particles in isopropyl alcohol (Snowtex IPA-ST-UP) is mixed with spherical silica particles in isopropyl alcohol (Snowtex IPA-ST-MS) in the weight ratios shown in Table 2. The Snowtex IPA-ST-MS silica sol contains 30% by weight silica having an average particle width of 17-23 nanometers. The coatings are prepared substantially in accordance with the procedure of Ex. 1-14 above. The contact angle (10 sec) measured for each of the coated films is presented in Table 2 below.

TABLE 2

| Example | Ratio of elongate/spherical (wt. % solids) | Coat Weight (g/m$^2$) | Contact Angle 10 sec (deg.) |
|---|---|---|---|
| 15 | 90/10 | 3.1 | 4.9 |
| 16 | 100/0 | 2.3 | 9.0 |
| 17 | 70/30 | 3.5 | 11 |
| 18 | 50/50 | 3.9 | 16 |

The results indicate that a minor amount of spherical silica added to the elongate particle silica improves the contact angle of the resulting coating. For comparative purposes, a coating of 100% spherical silica (Snowtex IPA-ST-MS) is prepared and coated onto a retroreflective sheet. However, the coating does not adhere to the retroreflective sheet so that the contact angle cannot be measured.

Example 19

A hydrolyzate oligomer of 3-glycidoxypropyl trimethoxysilane (GPTMS) is prepared by mixing 5 g of GPTMS with 1.14 g of aqueous HCL (0.12M), sirring the solution for 1 hour, 24 hours and 1 week to give hydrolysis and condensation product of GPTMS. The coating composition is prepared by mixing the hydrolyzed GPTMS (0.66 g) with 5 g IPA-ST-UP and 2.09 g of a solution of 3,6-dioxa-1,8-octanedithiol (DOT) in isopropyl alcohol. The coating composition is coated onto a retroreflective sheet (T-7500 from Avery Dennison) using a 0.5 mil gauge draw bar and an automatic coater. The coated film is dried at room temperature, and then cured in a convection oven at 75° C. for 1 hour. Table 3 below shows the contact angle and retroreflectivity of the coated substrates with and without Xenon Weathering (383 hours).

Figure 2:
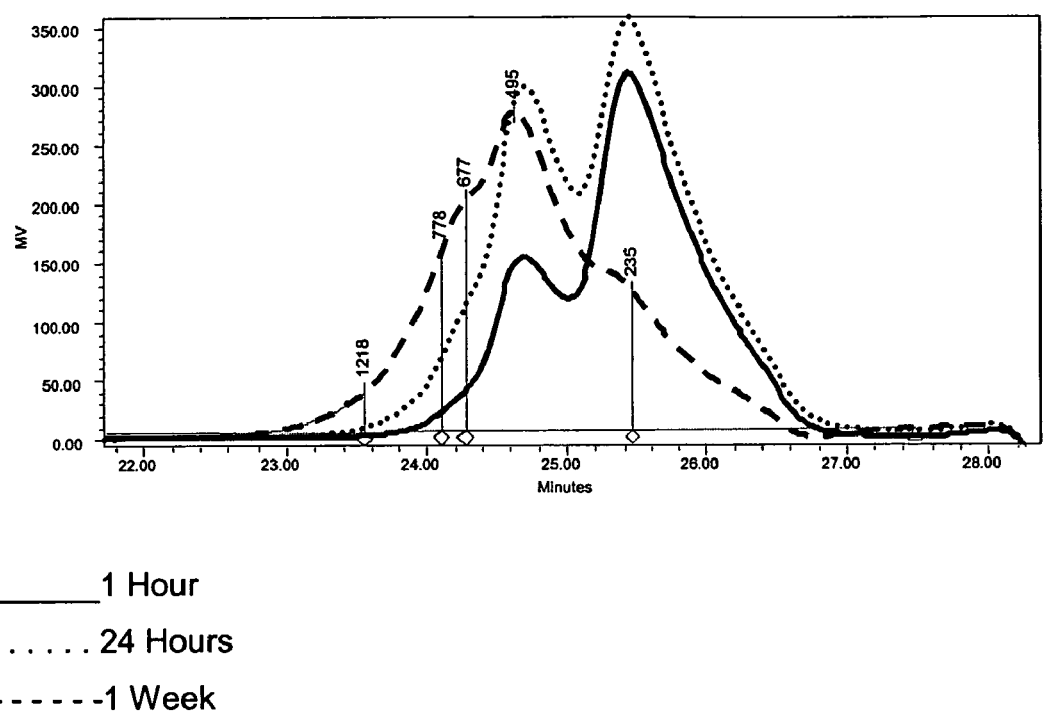
FIG. 2 is a gel permeation chromatography trace of various hydrolyzate oligomers of 3-glycidoxy propyltrimethoxy silane useful in the present invention.

FIG. 2 is a gel permeation chromatography trace that plots intensity as a function of elution time. The numbers noted on the plots reflect the molecular weight at the particular elution time. The intensity indicates the concentration and the time indicates the molecular weight. FIG. 2 illustrates the degree of hydrolysis of the GPTMS at 1 hour, 24 hours and 1 week.

TABLE 3

| Time for Hydrolysis | Xenon Hours | Avg. Retro-reflectivity | Water Contact Angle | | |
|---|---|---|---|---|---|
| | | | 0 sec | 5 sec | 10 sec |
| 1 hour | 0 | 1329 | 28 | 26 | 25 |
| | 383 | 1043 | 12 | 7 | 6 |
| 24 hours | 0 | 1371 | 25 | 24 | 22 |
| | 383 | 1216 | 9 | 6 | 5 |
| 1 week | 0 | 1362 | 23 | 21 | 20 |
| | 383 | 838 | 11 | 8 | 6 |

Examples 20-31

In Example 20, a hydrolyzate oligomer of 3-glycidoxypropyl trimethoxysilane (GPTMS) is prepared by mixing 5 g of GPTMS with 1.14 g of aqueous HCL (0.12M), stirring the solution for 1 hour to give hydrolysis and condensation product of GPTMS. The coating composition is prepared by mixing the hydrolyzed GPTMS (0.75 g) with 5 g IPA-ST-UP and 0.49 g of a 10% by weight solution of Tinuvin 1130 in isopropyl alcohol. Before coating the retroreflective sheet, 2.09 g of a solution of 3,6-dioxa-1,8-octanedithiol (DOT) in isopropyl alcohol is added drop-wise to the composition mixture. The mixture is stirred and degassed. The coating composition is coated onto a retroreflective sheet (T-7500 from Avery Dennison) using a 0.5 mil gauge draw bar and an automatic coater. The coated film is dried at room temperature, and then cured in a convection oven at 75° C. for 1 hour.

Examples 21-31 are prepared substantially in accordance with the procedure of Example 20, with the exception that the weight ratio of hydrolyzed GPTMS is varied as is the presence of UV absorber. Additionally, spherical silica is used in place of the elongate silica in Examples 26 to 31. Table 4 below shows the contact angle and retroreflectivity in the cross direction and in the machine direction of the coated substrates after Xenon Weathering (935 hours).

TABLE 4

| Example | Silica | % Solids | SiO$_2$:Binder (w/w solids) | UV Absorber (3% solids) | Contact Angle (degree/5 sec) | Reflectivity (cd/lux/m$^2$) (CD/MD) |
|---|---|---|---|---|---|---|
| 20 | IPA-ST-UP | 15 | 1:1 | yes | — | — |
| 21 | IPA-ST-UP | 15 | 3:1 | yes | 10 | 832/728 |
| 22 | IPA-ST-UP | 15 | 9:1 | yes | 7.9 | 1238/1047 |

TABLE 4-continued

| Example | Silica | % Solids | SiO$_2$:Binder (w/w solids) | UV Absorber (3% solids) | Contact Angle (degree/5 sec) | Reflectivity (cd/lux/m$^2$) (CD/MD) |
|---|---|---|---|---|---|---|
| 23 | IPA-ST-UP | 15 | 1:1 | no | 15.5 | 1368/1112 |
| 24 | IPA-ST-UP | 15 | 3:1 | no | 9.7 | 1218/989 |
| 25 | IPA-ST-MS | 15 | 9:1 | no | 8.5 | 1168/917 |
| 26 | IPA-ST-MS | 15 | 1:1 | yes | 17 | 1500/1237 |
| 27 | IPA-ST-MS | 15 | 3:1 | yes | 12 | 1343/960 |
| 28 | IPA-ST-MS | 15 | 9:1 | yes | 6.4 | 1300/986 |
| 29 | IPA-ST-MS | 15 | 1:1 | no | 16.6 | 1042/927 |
| 30 | IPA-ST-MS | 15 | 3:1 | no | 9.2 | 1362/1167 |
| 31 | IPA-ST-MS | 15 | 9:1 | no | 9.1 | 1521/1216 |

Examples 32-37

Examples 32-37 are prepared substantially in accordance with the procedure of Example 20, with the exception that the weight ratio of hydrolyzed GPTMS is varied as is the presence of UV absorber. Examples 36 and 37 use elongate silica in MEK in place of the elongate silica in isopropyl alcohol. Table 5 below shows the contact angle and retroreflectivity of the coated substrates.

Examples 38-39

For Example 38, a hydroxyethyl methacrylate (HEMA)/methyl methacrylate (MMA) copolymer solution is prepared by degassing, followed by heating at 60° C. for 24 hours a mixture of 2.3 g HEMA, 17.70 g MMA (10 mol MMA to 1 mol HEMA) and 0.05 g Vazo 64 in 80.0 g dry MEK. The coating composition is prepared by mixing 2.00 g of the polymer solution and 0.018 g aluminum acetylacetonate (AAA, 3% by weight with respect to solids) and 2.0 g Snowtex MEK-ST-UP. The coating composition is coated on retroreflective sheeting (Avery Dennison T-7500) using a 0.5 mil gauge draw bar and an automatic coater. The coated film is dried at room temperature and then cured in a convection oven at 75° C. for 1 hour.

Example 39 is prepared substantially in accordance with the procedure of Example 38, with the exception that weight ratio of silica to organic binder is varied.

Table 5 below shows the contact angle and retroreflection of the resulting coated substrates. Also shown is the contact angle and retroreflection of the coated substrates of Examples 21-35 after they have been subjected to corona treatment.

Examples 40-43a

Examples 40-43a are directed to dual layer dew resistant coatings. Specifically, a first primer layer is formed on the retroreflective sheet, followed by a second top layer formed over the primer layer.

Preparation of Primer A:

Primer A is prepared by mixing together in a 1:1 ratio by weight 3-glycidoxypropyl trimethoxysilane (GPTMS) and Snowtex IPA-ST-MS spherical particles.

Preparation of Primer B:

Primer B is prepared by mixing together in a 4:1 ratio by weight a methyl methacrylate/methoxypropyltrimethoxysilane copolymer (7.65:1 MMA:MOPTS) with hydrolyzed tetraethoxysilane.

Preparation of Primer C:

Primer C is prepared by mixing together in a 1:1 ratio by weight 3-glycidoxypropyl trimethoxysilane (GPTMS) and Snowtex IPA-ST-UP elongate particles.

Top Layer I:

The composition of Top Layer I is Snowtex IPA-ST-UP elongate particles.

Top Layer II:

The composition of Top Layer II is a photocatalyst solution of TiO$_2$ with a solids content of 9.4% (Bistrator NRC-300C from Nippon Soda Co., Ltd.).

Example 40

Control

Top Layer I is coated onto a retroreflective sheet (Avery T-7500) at a coat thickness of 1 mil (wet) and heated in a

TABLE 5

| Example | Silica | % Solids | SiO$_2$:Binder (w/w) | UV Absorber (3% solids) | Contact Angle (degree/5 sec) | Reflectivity (cd/lux/m$^2$) | Contact Angle (degree/5 sec) with corona treatment | Reflectivity (cd/lux/m$^2$) with corona treatment |
|---|---|---|---|---|---|---|---|---|
| 32 | IPA-ST-UP | 10 | 1:1 | yes | 14.7 | 1285/1296 | 13.9 | 1260/1247 |
| 33 | IPA-ST-UP | 10 | 3:1 | yes | 27.7 | 1276/1319 | 9.1 | 1211/1293 |
| 34 | IPA-ST-UP | 10 | 9:1 | yes | 18.8 | 1397/1364 | 6.9 | 1255/1293 |
| 35 | IPA-ST-UP | 10 | 1:0 | yes | 14.9 | 1314/1364 | 6.2 | 1273/1307 |
| 36 | MEK-ST-UP | 15 | 1:1 | no | 56.6 | 1129/1227 | — | — |
| 37 | MEK-ST-UP | 15 | 9:1 | no | 65.9 | 1122/1200 | — | — |
| 38 | MEK-ST-UP | 15 | 1:1 | no | 62.7 | 1194/1090 | — | — |
| 39 | MEK-ST-UP | 15 | 9:1 | no | 25.4 | 1168/1124 | — | — | convection oven at 70° C. for 30 minutes. The contact angle and retroreflectivity of the coated sheet is shown below in Table 6 below.

Example 41

Primer A is coated onto a retroreflective sheet (Avery T-7500) at a coat thickness of 1 mil (wet) and heated in a convention oven at 55° C. for 15 minutes. Top Layer I is then applied over Primer Layer A at a coat thickness of 1 mil (wet) and heated for at 70° C. for 1 hour. The contact angle and retroreflectivity of the coated sheet is shown below in Table 6 below.

Example 42

Primer B is coated onto a retroreflective sheet (Avery T-7500) at a coat thickness of 1 mil (wet) and heated in a convention oven at 70° C. for 1 hour. Top Layer I is then applied over Primer Layer B at a coat thickness of 1 mil (wet) and heated for at 70° C. for 1 hour. The contact angle and retroreflectivity of the coated sheet is shown below in Table 6 below.

Example 43

Primer C is coated onto a retroreflective sheet (Avery T-7500) at a coat thickness of 1 mil (wet) and heated in a convention oven at 55° C. for 15 minutes. Top Layer II is then applied over Primer Layer C at a coat thickness of 1 mil (wet) and heated for at 70° C. for 1 hour. The contact angle and retroreflectivity of the coated sheet is shown below in Table 6 below.

Example 43a

Example 43a is substantially the same as Example 43, with the exception that prior to measuring the contact angle and retroreflectivity, the coated substrate is placed in a Xenon Weatherometer overnight for UV activation of the Top Layer II. Subsequent to UV activation of the photocatalytic layer, the contact angle of the coated substrate decreases relative to that Example 43, the un-activated coated substrate.

TABLE 6

| Example | Primer | Top Layer | Contact Angle degree (std. dev.) | | | Retro-reflectivity |
| --- | --- | --- | --- | --- | --- | --- |
| | | | 0 sec | 5 sec | 10 sec | |
| 40 | — | I | 6.5 (0.6) | 5.1 (0.5) | 4.1 (0.2) | 1347 |
| 41 | A | I | 21.5 (1.6) | 19.2 (3.1) | 18.3 (1.0) | 1309 |
| 42 | B | I | 12.1 (0.2) | 5.2 (0.2) | 4.0 (0.3) | 1288 |
| 43 | C | II | 46.4 (4.3) | 45.5 (2.4) | 45.4 (2.3) | 1069 |
| 43a | C | II | 5.6 (0.6) | 4.5 (0.8) | 3.3 (0.5) | 1248 |

Examples 44-49

A coating of 100% elongate silica (Snowtex IPA-ST-UP) is applied to retroreflective sheeting at various coat weights. The coated sheeting is subjected to the Mandrel Test described above. Table 7 shows the results of the testing.

TABLE 7

| Example | Coat Weight (gsm) | Mandrel Rating* |
| --- | --- | --- |
| 44 | 0.57 | 0 |
| 45 | 0.81 | 1 |
| 46 | 1.12 | 3 |
| 47 | 1.13 | 2 |
| 48 | 1.27 | 3 |
| 49 | 2.85 | 5 |

*A rating of 0 indicates no cracks, 1 indicates some tiny cracks, 2 indicates thin and light cracks, 3 indicates moderate cracks, 4 indicates dense and thin cracks, 5 indicates dense and thick cracks.

Example 50

A hydrolyzate oligomer of 2-(3,4-epoxycyclohexyl)ethyl trimethoxysilane (CHTMS) is prepared by mixing 3 gms of CHTMS with 3.67 gms of isopropanol and 0.66 gms of aqueous HCl (0.12M), stirring the solution for 1 hour to obtain the hydrolysis and condensation product of CHTMS. The coating composition is prepared by mixing the hydrolyzed CHTMS (0.24 gms) with 6 gms of elongate silica particles in isopropyl alcohol (Snowtex IPA-ST-UP) and 0.03 gms [4-[(2-hydroxytetradecyl)oxy]-phenyl]phenyliodonium hexafluoroantimonate (a cationic UV initiator). The total solids content is decreased to a final 10% by weight by the addition of 3.76 gms of coating solvent isopropanol.

The coating composition is coated onto a retroreflective sheet (T-7500 from Avery Dennison Corporation) using a 0.5 mil gauge draw bar and an automatic coater. The coated film is dried at 70° C. for 2 minutes, and then UV cured using a Fusion UV System with an H-bulb at 35 fpm for 1 pass. The film is then corona treated prior to testing.

Examples 51-54

Dew resistant coatings are prepared substantially in accordance with the procedure of Example 50, with the exception that the amount of hydrolyzed CHTMS used is varied as shown in Table 8. The weight percent CHTMS shown is based on the total solids of the coating composition. The refractive index, obtained by the ellipsometry method for the coatings and the retroreflectivity of retroreflective sheets coated with the dew-resistant coatings as compared to the uncoated retroreflective sheets (two samples of each coating) are shown in Table 8. The retroreflectivity was measured in the machine direction (MD) and the cross direction (CD) for each sample.

TABLE 8

| Example | % wt. CHTPMS | Refractive Index | Uncoated MD | Uncoated CD | After Coating MD | After Coating CD |
|---|---|---|---|---|---|---|
| 50 | 20 | 1.29 | 1177 | 1152 | 1218 | 1210 |
|    |    |      | 1137 | 1153 | 1208 | 1216 |
| 51 | 5  | 1.35 | 1120 | 1115 | 1244 | 1255 |
|    |    |      | 1101 | 1140 | 1199 | 1237 |
| 52 | 7  | 1.38 | 1054 | 1119 | 1302 | 1299 |
|    |    |      | 1103 | 1121 | 1232 | 1257 |
| 53 | 50 | 1.49 | 1134 | 1159 | 1207 | 1254 |
|    |    |      | 1139 | 1156 | 1299 | 1285 |
| 54 | 10 | —    | —    | —    | —    | —    |

Example 55

A dew resistant coating is prepare substantially in accordance with the procedure of Example 50, with the exception that the hydrolysis and condensation reactions of CHTMS are carried out by reacting the monomer CHTMS in an aqueous solution of elongate silica particles followed by vacuum distillation to remove the water and subsequent dilution with isopropanol.

Example 56

A hydrolyzate oligomer of 2-(3,4-epoxycyclohexyl)ethyl trimethoxysilane (CHTMS) is prepared by mixing 3 gms of CHTMS with 3.67 gms of isopropanol and 0.66 gms of aqueous HCl (0.12M), stirring the solution for 1 hour to obtain the hydrolysis and condensation product of CHTMS. The coating composition is prepared by mixing the hydrolyzed CHTMS (0.24 gms) with 6 gms of elongate silica particles in isopropyl alcohol (Snowtex IPA-ST-UP) and 0.03 gms 3,6-dioxa-1,8-octanedithiol (DOT). The total solids content is decreased to a final 10% by weight by the addition of 3.76 gms of coating solvent isopropanol. The coating composition is coated onto a retroreflective sheet (T-7500 from Avery Dennison Corporation) using a 0.5 mil gauge draw bar and an automatic coater. The coated film is dried at 70° C. for 2 minutes, and then cured in a convection oven at 75° C. for 1 hour.

Table 9 below shows the percent blackout for examples of the dew resistant coating that were coated onto retroreflective sheeting (Avery Dennison T-7500).

TABLE 9

| | Percent Blackout | | | |
|---|---|---|---|---|
| Days | Uncoated | Example 1 | Example 51 | Example 52 |
| 0  | 100% | 40% | 86% | 86% |
| 4  | 100% | 67% | —   | —   |
| 6  | 100% | 38% | —   | —   |
| 13 | 100% | 45% | —   | —   |
| 22 | 100% | 50% | —   | —   |
| 25 | 100% | —   | 46% | 54% |
| 27 | 100% | —   | 33% | 33% |
| 29 | 100% | —   | 52% | 52% |
| 34 | 100% | —   | 9%  | 9%  |
| 36 | 100% | —   | 15% | 15% |
| 48 | 100% | 31% | —   | —   |
| 50 | 100% | 27% | —   | —   |
| 52 | 100% | 67% | —   | —   |
| 57 | 100% | 25% | —   | —   |
| 59 | 100% | 27% | —   | —   |

The dew resistant coatings of Examples 1, 50, 52 and 54 were evaluated for durability. Specifically, the retroreflectivity and contact angle for these coatings on a retroreflective sheet (T-7500 from Avery Dennison Corporation) prior to exposure and after 4502 hours of Xenon weathering are Shown in Table 10 below.

TABLE 10

| | Retroreflectivity | | Contact Angle | |
|---|---|---|---|---|
| Example | Before exposure | 4502 hrs Xe | Before exposure | 4502 hrs Xe |
| 1  | 1310 | 1237 | 4.7 | 6.0  |
| 50 | 1010 | 1124 | 2.8 | 8.8  |
| 52 | 1192 | 1119 | 3.5 | 11.6 |
| 54 | 1112 | 1160 | 4.5 | 10.1 |

The durability of dew resistant coatings of Examples 50 and 51 were evaluated on various retroreflective substrates as shown in Table 11 below. Specifically, the contact angle was measured for samples coated on Retroreflective sheeting (T-7500 from Avery Dennison Corporation) before and After 2120 hours of Xenon weathering.

TABLE 11

| Example | Substrate | Contact Angle Before Exposure [deg. (std. dev.)] | Contact Angle After 2120 hours [deg. (std. dev.)] |
|---|---|---|---|
| 50 | white | 25.3 (1.7) | 7.2 (1.0)  |
| 50 | blue  | 26.7 (1.2) | 7.7 (2.0)  |
| 50 | green | 26.4 (0.5) | 5.9 (1.0)  |
| 51 | white | 25.0 (0.8) | 9.5 (3.0)  |
| 51 | blue  | 25.7 (0.9) | 10.7 (1.0) |
| 51 | green | 25.8 (0.2) | 11.9 (1.0) |

Although the invention has been shown and described with respect to a certain embodiment or embodiments, it is obvious that equivalent alterations and modifications will occur to others skilled in the art upon the reading and understanding of this specification. In particular regard to the various functions performed by the above described elements (components, assemblies, compositions, etc.), the terms used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A retroreflective article comprising a substrate having a retroreflective surface thereon, and a coating overlying the retroreflective surface, the coating comprising (a) at least about 75% by weight of elongate silica particles having an aspect ratio greater than 1, and (b) an organic binder comprising at least one hydrolysis product or at least one partial condensate of an epoxy functional silane, wherein the coating comprises about 15 to 25% by weight of an organic binder.

2. The article of claim 1 wherein the silane is selected from glycidoxy methyltrimethoxysilane, 3-glycidoxypropyltrihydroxysilane, 3-glycidoxypropyl-dimethylhydroxysilane, 3-glycidoxypropyltrimeth-oxysilane, 3-glycidoxypropyltriethoxysilane, 3-glycidoxypropyl-dimethoxymethylsilane, 3-glycidoxypropyldimethylmethoxysilane, 3-glycidoxypropyltributoxysilane, 1,3-bis(glycidoxypropyl)tetramethyldisiloxane, 1,3-bis(glycidoxypropyl)tetramethoxydisiloxane, 1,3-bis(glycidoxypropyl)-1,3-dimethyl-1,3-dimethoxydisiloxane, 2,3-epoxypropyl-trimethoxysilane, 3,4-epoxybutylt-rimethoxysilane, 6,7-epoxyheptyl-trimethoxysilane, 9,10-epoxydecyltrimethoxysilane, 1,3-bis(2,3-epoxypropyl)tetramethoxydisiloxane, 1,3-bis(6,7-epoxyheptyl)tetramethoxydisiloxane, 2-(3,4-epoxycyclohexyl)ethyltrimethoxysilane and combinations of two or more thereof.

3. The article of claim 1 wherein the coating further comprises an organosilane compound not having epoxy functionality.

4. A retroreflective article comprising a substrate having a retroreflective surface thereon, and a coating overlying the retroreflective surface, the coating comprising (a) at least about 75% by weight of elongate silica particles having an aspect ratio greater than 1, and (b) an organic binder comprising at least one hydrolysis product or at least one partial condensate of silane compound, wherein the silane compound comprises cyclohexyltrimethoxysilane.

5. A retroreflective article comprising a substrate having a retroreflective surface thereon, and a coating overlying the retroreflective surface, the coating comprising (a) at least about 75% by weight of elongate silica particles having an aspect ratio greater than 1, and (b) an organic binder comprising at least one hydrolysis product or at least one partial condensate of an epoxy functional silane, wherein the coating further comprises spherical silica particles having an average diameter of less than 50 nanometers.

6. A retroreflective article comprising a substrate having a retroreflective surface thereon, and a coating overlying the retroreflective surface, the coating comprising (a) at least about 75% by weight of elongate silica particles having an aspect ratio greater than 1, and (b) an organic binder comprising at least one hydrolysis product or at least one partial condensate of an epoxy functional silane, wherein the coating further comprises titanium dioxide nanoparticles.

7. A retroreflective article comprising a substrate having a retroreflective surface thereon, and a coating overlying the retroreflective surface, the coating comprising (a) at least about 75% by weight of elongate silica particles having an aspect ratio greater than 1, and (b) an organic binder comprising at least one hydrolysis product or at least one partial condensate of an epoxy functional silane, wherein the silica particles comprise chain silica particles.

* * * * *